United States Patent [19]

Schmid et al.

[11] 4,229,021
[45] Oct. 21, 1980

[54] PASSENGER MOTOR VEHICLE

[75] Inventors: Walter Schmid, Sindelfingen, Fed. Rep. of Germany; Karl Wilfert, deceased, late of Gerlingen-Waldstadt, Fed. Rep. of Germany, by Dorothea Wilfert nee Rischawy, legal heir Gerlingen-Waldstadt, Fed. Rep. of Germany; by Thomas Wilfert, legal heir, Markgröningen, Fed. Rep. of Germany

[73] Assignee: Daimler-Benz Aktiengesellschaft, Fed. Rep. of Germany

[21] Appl. No.: 839,418

[22] Filed: Oct. 5, 1977

[30] Foreign Application Priority Data

Oct. 5, 1976 [DE] Fed. Rep. of Germany ....... 2644870

[51] Int. Cl.² .................. B62D 31/00; B62D 27/04
[52] U.S. Cl. .................. 280/787; 296/35.1; 296/196
[58] Field of Search .................. 296/28 F, 35 R; 280/786, 787, 790

[56] References Cited

U.S. PATENT DOCUMENTS

| 2,352,054 | 6/1944 | Wilfert et al. | 280/787 |
| 2,972,498 | 2/1961 | Kelley | 296/35 R |
| 3,276,532 | 10/1966 | Yonkers | 280/787 |
| 3,889,968 | 6/1975 | Wilfert et al. | 280/111 |
| 4,093,255 | 6/1978 | Wilfert et al. | 280/788 |

Primary Examiner—Richard A. Bertsch
Attorney, Agent, or Firm—Craig and Antonelli

[57] ABSTRACT

A motor vehicle encompassing a chassis which includes a front and rear axle and a vehicle body which is supported upon the chassis by at least two connecting parts in such manner that the body may move in a translatory manner with respect to the chassis while being capable of pivoting about an axis located in the driving direction. Additionally, the support of at least one of each wheels springs is coordinated between the corresponding axle and the vehicle body. The connecting part includes a support column which, at its upper end, is elastically connected to the vehicle body by a substantially central bearing support and, at its lower end, is supported upon the chassis by several bearing supports.

21 Claims, 4 Drawing Figures

PASSENGER MOTOR VEHICLE

The present invention relates to a motor vehicle with a chassis comprising a front and rear axle and a vehicle body which is supported upon the chassis by way of at least two and at most three connecting and guiding means in such a manner that a body may move in a translatory manner with respect to the chassis while also being capable of pivoting about an axis of rotation disposed in the driving direction. The connecting and guiding means being elastically retained at least at one end and arranged in cross planes one disposed behind the other in the driving direction.

The present invention is concerned with the task of providing a motor vehicle construction which may be easily manufactured and which influences the driving behavior and comfort of the motor vehicle in a favorable manner.

According to the present invention, this is achieved, in for example a motor vehicle of the aforementioned type in which the support of the wheel springs is coordinated between the corresponding axle and the vehicle body. Additionally, connecting means comprising a support column which is elastically connected, at its upper end, the vehicle body by way of a central bearing support while being supported at its lower end, upon the chassis by several bearing supports whose lines of action intersect in the vertical axis of the support column. The vertical axis of the support column may thereby coincide with the upright axis of rotation of the central bearing support. With this construction the vehicle body is substantially carried, ie. (supported) by the wheel springs so that the support column can be relatively light in weight and, with a corresponding high prestress of the wheel springs, may be stressed or loaded according to the present invention only in tension. According to the present invention, the construction of the central upper bearing support may be anisometric in order to enable a corresponding matching with regard to different loads, especially with regard to different shock loads and stresses.

The point of intersection of the lines of action of the lower bearing supports may be located, according to the present invention, below or above the bearing support plane. Therefore, the location of the bearing support plane can be preserved while, at the same time, both low and high ideal lower points of pivotal connection of the support columns to the chassis can be realized whereby the chassis may also include so-called drive stools.

An especially appropriate location of the intersection of the lines of action of the lower bearing supports is one in which the point of intersection is located in the center of the torsional vibrations or rotary oscillations of its chassis. Such location substantially prevents a transmission of said longitudinal vibrations and oscillations, which occur preferably at certain frequencies of the chassis, onto the vehicle body.

The present invention proves to be especially appropriate when utilized in conjunction with independent wheel suspensions whereby, depending on the type of wheel suspension, the wheel springs are exclusively supported with respect to the vehicle body with the shock absorber being arranged between the wheel guide members and the chassis. Such a combination provides particularly good insulation with respect to high frequency vibrations and oscillations.

When, within the scope of the present invention, at least one support column is provided for an axle of the vehicle and inclination of the wheel springs corresponding to their inclination provides support effects during the starting and braking of the vehicle which substantially reduce or prevents brake-nose diving or starting pitching.

Accordingly, it is an object of the present invention to provide a motor vehicle which avoids, by simple means, the aforementioned shortcomings and drawbacks encountered in the prior art.

Another object of the present invention is to provide a motor vehicle which influences the driving behavior and comfort of the motor vehicle in a favorable manner by extremely simple means.

A further object of the present invention resides in a motor vehicle which permits the realization of a particularly favorable construction which is simple and can be readily matched to the characteristics desired to be obtained with the vehicle.

Still another object of the present invention resides in a motor vehicle in which supporting means thereof can be relatively light weight to thereby reduce the overall weight of the vehicle.

Another object of the present invention resides in a motor vehicle in which the body is substantially isolated against vibrations and shocks coming from the road, especially against high-frequency vibrations.

A further object of the invention resides in a motor vehicle in which the nose-diving during braking or pitching during acceleration can be substantially reduced by simple structural means.

These and other objects, features and advantages of the present invention will become more apparent from the following description when taken in conjunction with the accompanying drawings which show, for purposes of illustration only, several embodiments in accordance with the present invention and wherein.

Figure 1:
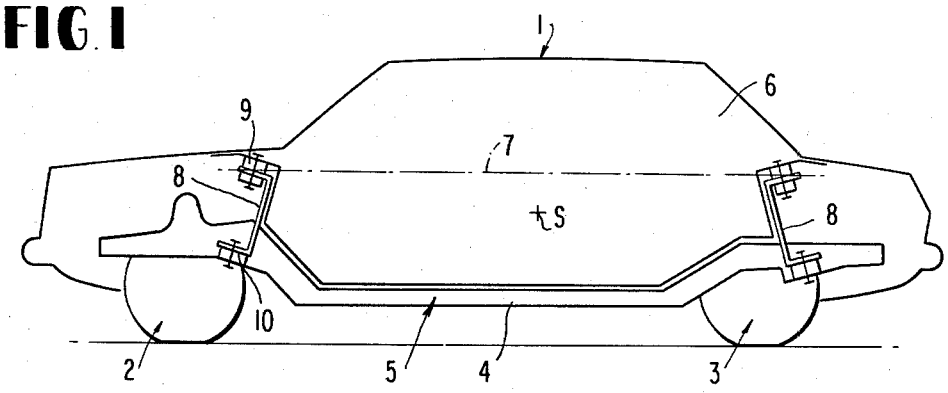
FIG. 1 is a schematic side elevational view of a passenger motor vehicle according to the present invention which demonstrates the approximate diagrammatic arrangement of the support columns or support elements at both axles. The detailed structure of the support columns as disclosed in FIGS. 2-4.

Referring now to the drawings wherein like reference numerals are used throughout the various views to designate like parts, reference numeral 1 designates in FIG. 1 a passenger motor vehicle which includes a front axle generally designated by reference numeral 2 and a rear axle generally designated by reference numeral 3 which together with a frame or floor group numeral 4 connecting the same form the chassis generally designated by reference numeral 5 on which the vehicle body is supported in such manner as to prevent translatory movements while being incapable of pivoting about an axis of rotation 7 extending in the vehicle longitudinal direction by connecting means which comprise support columns 8. The axis of rotation, numeral 7, lies above the center of gravity S of the vehicle body, number 6.

The connecting means which comprises support columns 8, upper bearing support 9 and lower bearing supports 10 which retain the support column whereby the upper bearing supports 9 determine the location of the axis of rotation 7 and establish the connection between the support column 8 and the vehicle body 6.

In the illustrated embodiment, elastic elements 11, which, within the scope of the present invention, may be anisometric elements are provided as upper bearing supports 9 whose upright axis of rotation preferably coincides with the center axis of the support columns 8.

Figure 2:
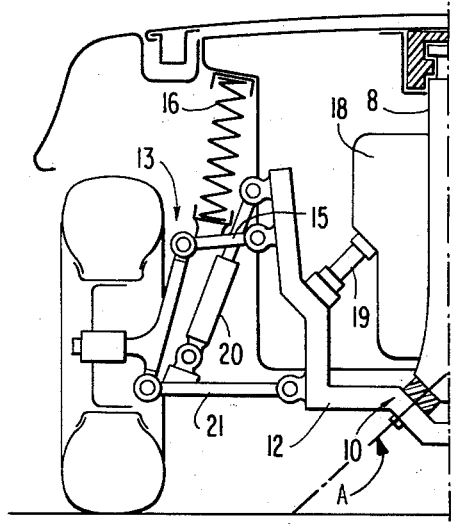
FIG. 2 is a partial schematic transverse cross-sectional view through ½ of a passenger motor vehicle according to the present invention for the support coordinated especially to the front axle of the vehicle as viewed from the rear of the front axle.
Figure 3:
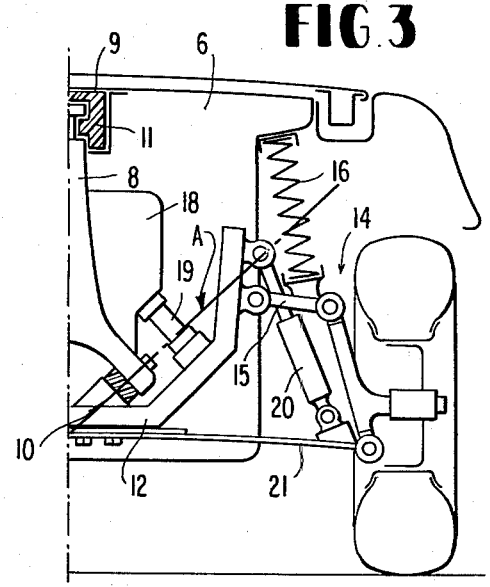
FIG. 3 is a partial schematic transverse cross-sectional view through ½ of a modified embodiment of a passenger motor vehicle in accordance with the present invention between the chassis and the vehicle body coordinated in particular to the front axle of a passenger motor vehicle, again as viewed from the rear of the front axle.

In the rear view of FIGS. 2 and 3 each of which show only ½ of an otherwise symetrical arrangement, the lower bearing supports 10 are each supported with respect to a front axle stool 12 which is a part of the chassis 5 and on which the front wheels are supported by independent wheel suspensions generally designated by reference numeral 13 (FIG. 2) and 14 (FIG. 3). The wheel suspensions 13 and 14 may be of any known construction with both wheels suspensions utilizing an upper cross guide 15, on which is supported the wheel frame 16 which is formed in the illustrated embodiment by a coil spring which, at its opposite side, is supported by the vehicle body 6.

The lower bearing supports 10 which are supported on the front axle stool 12, are arranged in such a manner that their lines of action extend at an angle to the axis of rotation of the upper bearing support 9 which coincides with the axes of the support column 8. The lines in action of the lower bearing supports 10 thereby have a common point of intersection located in the axis of rotation of the upper bearing support 9. In the embodiment according to FIG. 2 this point of intersection is located above the plane containing the lower bearing supports 10 while in the embodiment according to FIG. 3 said intersection is below this plane.

By an appropriate construction in accordance with the present invention, the point of intersection of the lines of action can be located by way of a corresponding inclination of the lower bearing supports 10 so that the intersection takes place within the center of the torsional vibrations or rotary oscillations of the chassis occurring at certain critical frequencies and which effect vibrations or oscillations of the chassis about a vehicle longitudinal axis. As a consequence of ideally locating the point of intersection of the lines of action of the lower bearing supports 10 and this vibration rotary axis the mentioned vibrations or oscillations are not transmitted onto the vehicle body.

In accordance with FIGS. 2 and 3, the engine 18 is preferably supported on a driving stool and, more particularly, preferably by way of elastic supports 19 which are of conventional construction. By utilizing this configuration, engine vibrations cannot be transmitted directly onto vehicle body 6. This configuration, as well as the pivotal connection of the shock absorbers 20 to the front axle stool 12 and therewith also the chassis 5, has, as a consequence a further improvement in the comfort. Due to the above-described arrangement of the shock absorbers, the high frequency vibrations and hard shocks absorbed by them are not directly transmitted onto the vehicle body 6. The follows from the fact that when the shock absorbers are supported as illustrated in FIGS. 2 and 3 on the lower cross guide members 21 the high-frequency vibrations and hard schocks are initially transmitted onto the chassis 5, from which they can pass over onto the vehicle body at least only in very damp form by way of the support columns 8.

Figure 4:
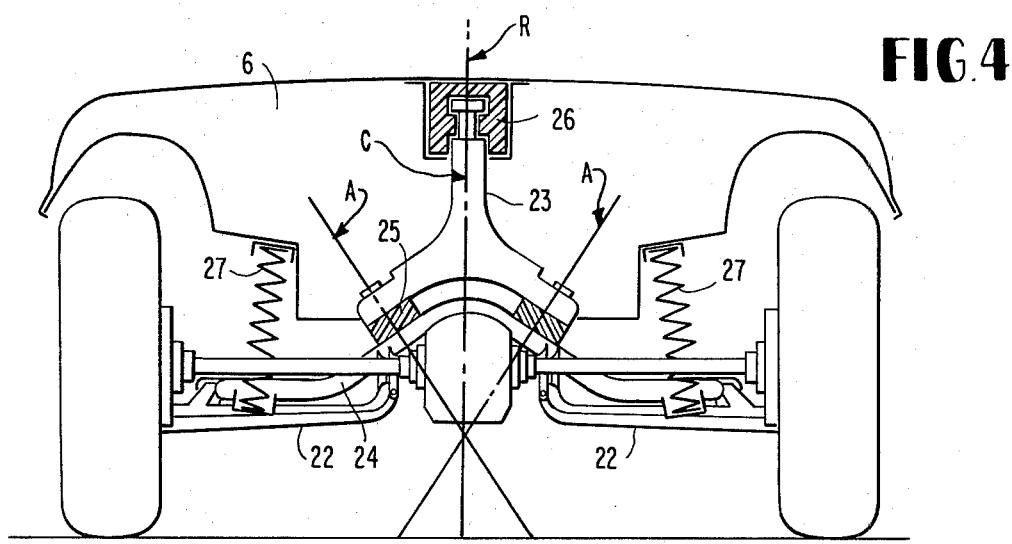
FIG. 4 is a schematic transverse cross-sectional view through still another modified embodiment of a support in accordance with the present invention of the vehicle body with respect to the chassis, especially for a rear axle as viewed by the rear thereof.

A corresponding support of the vehicle body 6 with respect to the rear axle 3 is illustrated in FIG. 4, wherein the pivotal connection of the wheel guide members 22, constructed in this embodiment as inclined guide members, by means of which an independent wheel suspension is achieved, and the support of the support columns 23 on the chassis again takes place with respect to a driving stool 24 coordinated to the chassis 5. The lower pivotal connection of the support column 23 to the driving stool 24 takes place by way of lower bearing supports 25, and more particularly, as previously described, by at least two lower bearing supports 25 whose lines of action A intersect, as indicated, in FIG. 4, in the center line C of the support column 23, which coincides with the axis of rotation R of the upper bearing support 26. The upper bearing support 26 may be formed in this embodiment by an antisymmetric elastic element, by way of which the support column 23 is connected to the vehicle body 6. As illustrated in FIG. 4, the wheel springs 27 in this embodiment are coordinated between the inclined guide members 22 and the vehicle body 6.

In the construction according to the present invention, the wheel springs can be selected based upon their stiffness with a view towards driving behavior and driving comfort. The springs may be selected and dimensioned so that their support column 8 or 23 may be loaded or stressed in tension which is particularly favorable for the stressing thereof and enables a particularly lightweight construction of the support column.

The solution according to the present invention provides through simple means a crank-like support of the vehicle body upon the chassis wherein the point of support on the side of the body is located above the point of support on the side of the chassis, without the danger of instabilities. In particular, the point of support on the side of the vehicle body can be very high with respect to the chassis owing to the solution according to the present invention. Additionally, a tilting of the drive stool is prevented by constructing the connection between the support column and the driving stool in accordance with the present invention. For this purpose an auxiliary spring may, additionally, be provided, as schematically indicated in FIG. 3, in which the lower cross-guide member 21 of the independent wheel suspension 14 is formed by a transverse leaf spring. This type of construction of the lower bearing supports of the support column makes it possible, within the scope of the present invention, not to permit vibrations, especially rotary impacts or shocks (caused principally by shock absorber forces), to effect the support column which is operable in the manner of a crane, so that they are not noticed by the passengers of the vehicle body.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A motor vehicle comprising:
   (a) chassis means with front and rear axle;
   (b) vehicle body means;
   (c) connecting means including at least two support column means elastically retained at least at one end and provided with upper and lower bearing support means; and
   (d) wheel spring means coordinated between the chassis means and the vehicle body means;

wherein said connecting means supports the vehicle body means upon the chassis means by way of at least two support column means arranged one behind the other, transverse to the driving direction, with at least one support column means being elastically connected, at its upper end, to the vehicle body means by a substantially central upper bearing support means and being further connected, at its lower end, to the chassis means by lower bearing support means whose lines of action intersect approximately in the vertical axis of the support column means;

whereby said support column means is operable in the manner of a crank and thus the vehicle body means may move in a translatory manner with respect to the chassis means while also being capable of pivoting about an axis located substantially in the driving direction.

2. A motor vehicle according to claim 1, wherein the point of intersection of the lines of action of the lower bearing support means is located below said lower bearing support means.

3. A motor vehicle according to claim 2, wherein the chassis means further comprises means for independently suspending the wheels of the vehicle.

4. A motor vehicle according to claim 3, wherein the chassis means further comprises shock absorber means connected between the axle and chassis means.

5. A motor vehicle according to claim 4, wherein said chassis means further comprises a driving stool with the shock absorber means being connected between the driving stool and the axle.

6. A motor vehicle according to claim 1, wherein the point of intersection of the lines of action of the lower bearing support means is located above said lower bearing support means.

7. A motor vehicle according to claim 6, wherein the chassis means further comprises means for independently suspending the wheels of the vehicle.

8. A motor vehicle according to claim 7, wherein the chassis means further comprises shock absorber means connected between the axle and chassis means.

9. A motor vehicle according to claim 8, wherein said chassis means further comprises a driving stool with the shock absorber means being connected between the driving stool and the axle.

10. A motor vehicle according to claim 1, wherein the point of intersection of the lines of action of the lower bearing support means is located in the center of the rotary oscillations of the chassis means.

11. A motor vehicle according to claim 10, wherein the chassis means further comprises means for independently suspending the wheels of the vehicle.

12. A motor vehicle according to claim 11, wherein the chassis means further comprises means for independently suspending the wheels of the vehicle.

13. A motor vehicle according to claim 12, wherein said chassis means further comprises a driving stool with the shock absorber means being connected between the driving stool and the axle.

14. A motor vehicle according to claim 1, wherein the chassis means further comprises means for independently suspending the wheels of the vehicle.

15. A motor vehicle according to claim 14, wherein the chassis means further comprises shock absorber means connected between the axle and chassis means.

16. A motor vehicle according to claim 15, wherein said chassis means further comprises a driving stool with the shock absorber means being connected between the driving stool and the axle.

17. A motor vehicle according to claim 1, wherein the chassis means further comprises shock absorber means connected between the axle and chassis means.

18. A motor vehicle according to claim 17, wherein said chassis means further comprises a driving stool with the shock absorber means being connected between the driving stool and the axle.

19. A motor vehicle according to claim 18, wherein the point of intersection of the lines of action of the lower bearing support means is located below said lower bearing support means.

20. A motor vehicle according to claim 18, wherein the point of intersection of the lines of action of the lower bearing support means is located above said lower bearing support means.

21. A motor vehicle according to claim 18, wherein the point of intersection of the lines of action of the lower bearing support means is located in the center of the rotary oscillations of the chassis means.

* * * * *